United States Patent [19]
Wittenberg

[11] 4,260,252
[45] Apr. 7, 1981

[54] METHOD AND APPARATUS FOR IMMOBILIZING A CONTACT LENS

[76] Inventor: Sidney Wittenberg, 52 Surrey La., Sudbury, Mass. 01776

[21] Appl. No.: 97,639

[22] Filed: Nov. 27, 1979

[51] Int. Cl.³ .............................................. G01N 21/01
[52] U.S. Cl. .................................... 356/124; 350/245; 356/244
[58] Field of Search ....................... 356/124, 244, 246; 350/245

[56] References Cited

U.S. PATENT DOCUMENTS

| | | | |
|---|---|---|---|
| 3,779,648 | 12/1973 | Poster | 356/124 |
| 3,985,445 | 10/1976 | Tagnon | 356/125 |
| 4,072,428 | 2/1978 | Moss | 356/244 |

FOREIGN PATENT DOCUMENTS 2557252  6/1977  Fed. Rep. of Germany ........... 356/124

*Primary Examiner*—John K. Corbin
*Assistant Examiner*—Bruce Y. Arnold
*Attorney, Agent, or Firm*—Finnegan, Henderson, Farabow, Garrett and Dunner

[57] ABSTRACT

A method and apparatus for immobilizing a contact lens without distortion to facilitate accurate measurement of its physical dimensions. The lens is floated on the surface of a liquid just out of contact with a support member. The support member is disposed to interact with the lens, through surface tension effects of the liquid, to immobilize the lens on the surface of the liquid.

16 Claims, 5 Drawing Figures

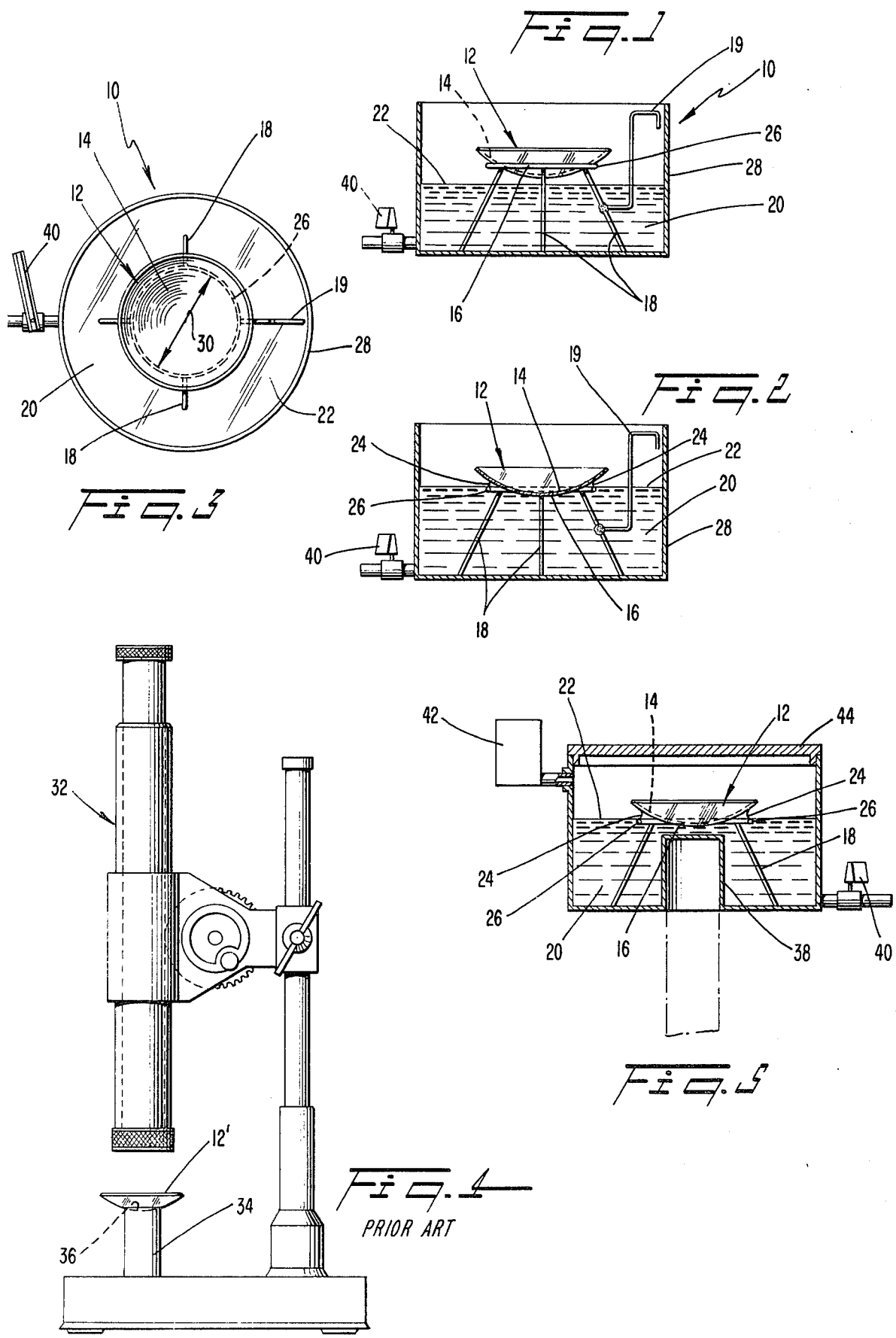

METHOD AND APPARATUS FOR IMMOBILIZING A CONTACT LENS

BACKGROUND OF THE INVENTION

The present invention relates to a means for immobilizing a contact lens to facilitate measurement of its physical dimensions.

The use of contact lenses to compensate for refractive error and thereby improve visual acuity is based on the shape of the lens and its relationship to the eye of the wearer. In order to provide the proper fit to the eye of the wearer, the concave surface of the lens must be of the proper curvature. The shape and physical dimensions of the lens also determine the optical characteristics of the lens, which interact with the eye of the wearer, to produce the desired degree of compensation. Numerous means exist for determining the physical dimensions of the eye of the wearer in order to specify the physical dimensions of the lens to be used by the particular wearer. In addition, devices exist for the measurement of the physical dimensions of a contact lens to ensure that it fits the wearer and produces the desired degree of compensation.

A particular problem exists for the measurement of the physical dimensions of what are termed "soft" or "hydrophilic" contact lenses because the lens is soft, supple and readily deformable. As a result, physical forces applied to the lens have the potential to distort the lens and in turn disturb the measurements being taken.

References disclosing various techniques for measuring the physical characteristics of soft contact lenses include radius gauge type apparatus, as for example, that show in U.S. Pat. No. 4,072,428. U.S. Pat. No. 3,779,648 discloses a means for holding a contact lens in order to effect measurements thereon. U.S. Pat. No. 3,985,445 discloses an apparatus for measuring characteristics of contact lenses including a holder that is immersed in a liquid. The lens is placed within a collar-like member having an aperture appropriate to the diameter of the lens. In such a device not only is the lens contacted physically but the device requires the use of different collar-like members, the sizes of which are determined by the diameter of the lens being measured. Furthermore, such a device has a specialized function and is relatively complex and expensive. This type of device would find use only by those who could justify a large capital investment.

In addition, there are numerous journal articles dealing with the measurement of contact lenses and specifically hydrophilic contact lenses that show means for supporting the lens within a fluid medium. All of the means known to support a contact lens to facilitate measurement of its physical or optical parameters involve the use of physical contact with the lens by a rigid member to support or immobilize the lens during measurement. Because of the physical contact with the lens all of such devices have the capacity to distort the lens. In addition, the portion of the device that contacts the lens must be able to accommodate lenses of various radii and diameters. Furthermore, many of the devices use special types of equipment rather than allow the use of standard optical measuring equipment in combination with a lens holding device.

It is the primary object of the present invention to provide a means for immobilizing a contact lens to facilitate measurement thereof without significant distortion.

It is a further object of the present invention to provide a means of immobilizing a soft or hydrophilic contact lens on the surface of a liquid medium such that its physical characteristics can be measured by the use of standard optical equipment.

Further objects of the present invention will be disclosed in connection with the description of the preferred embodiments set out below.

SUMMARY OF THE INVENTION

In accordance with the purpose of the invention as embodied and broadly described herein, the apparatus for immobilizing a contact lens comprises a suport means defining an aperture therethrough. The plane of the aperture is generally horizontal with the aperture also having a diameter less than the diameter of the contact lens. A liquid surrounds the support means within means for containing the liquid. The immobilized lens is concentric with, and floats just above, the aperture. The apparatus includes means for placing the lens on the surface of the liquid such that the lens can be immobilized by balanced surface tension forces between the lens and the portion of the support means defining the aperture.

The method of immobilizing a contact lens to facilitate the remote measurement comprises the steps of floating the lens on the surface of a liquid and applying balanced surface tension forces to the convex exterior surface of the lens. Preferably, the method includes supporting the lens on a support means which has an aperture passing therethrough. The support means and the lens are placed within a container having liquid therein. The lens floats off of the support. The level of the liquid is maintained in relation to the support means such that the surface tension of the liquid interacts with both the portion of the support means defining the aperture and the exterior surface of the lens to apply balance surface tension forces to the lens. With the lens so immobilized, remote measurement of the physical characteristics of the lens can be readily accomplished.

BRIEF DESCRIPTION OF THE DRAWINGS

The accompanying drawings which are incorporated in and constitute a part of the specification illustrate several embodiments of the invention and together with the description serve to explain the principles of the invention.

Of the drawings:

FIG. 1 is a cross-sectional view showing the relationship of the lens to the support means and the liquid within the container.

FIG. 2 is a cross-sectional view showing the contact lens out of contact with the support means and immobilized.

FIG. 3 is a top view of the embodiment of FIGS. 1 and 2.

FIG. 4 is a prior art apparatus used to measure the curvature of a contact lens.

FIG. 5 is an embodiment of the device of FIGS. 1-3 modified to be used in connection with the apparatus of FIG. 4.

DESCRIPTION OF THE PREFERRED EMBODIMENT

Reference will now be made in detail to the present preferred embodiments of the invention, an example of which is illustrated in the accompanying drawings.

In accordance with the invention, the apparatus for immobilizing a contact lens comprises a support means having an aperture therethrough. The plane of the support means is generally horizontal and the aperture has a diameter less than the diameter of the lens.

As here embodied and depicted in FIGS. 1-3, the apparatus, numbered generally as 10, is comprised of a container 28 having a support member 18 therein. The support member defines an aperture 30 by its upper extremity 26. The support member 18 and the lens 12 are surrounded by a liquid medium 20. It is the interaction of the liquid medium 20 with the portion of the support means 18 defining the aperture 30 that provides the immobilizing effect allowing the measurement of the physical dimensions of the lens 12.

In accordance with the invention, the apparatus further includes means for placing the lens on the surface of the liquid such that the lens can be immobilized by balanced surface tension forces between the portion of the support means defining the aperture and the lens.

As here embodied, the apparatus includes a container 28 containing liquid 20. Several means for placing the lens on the surface of the liquid are disclosed herein. The level of fluid within the container can be changed (as depicted in FIGS. 1-3 with the valve 40) or the location of the support means in relation to the surface 22 of the liquid 20 could be changed to provide a similar effect. In a preferred embodiment, the support means includes means for grasping the support means when it has a lens situated thereon. As here embodied, the support means 18 includes a member 19 affixed to one of the legs. Such an embodiment allows the lens 20 on the support means 18 to be readily placed within the container 28. If the liquid 20 within the container 28 is at the proper level, the lens 12 will float off of the support means 18 and be immobilized by the surface tension forces between the outer surface 16 of the lens 12 and the portion of the support means 18 defining the aperture 30. When the lenses being measured have similar dimensions, a number of lenses can be measured with this embodiment without changing the level of the liquid 20 within the container 28.

The liquid used in connection with the present invention may have an index of refraction sufficiently different from the lens material such that the interface between the lens and the liquid (the convex outer surface 16) may be perceived by ordinary optical devices. If the index of refraction of the liquid 20 matches that of the lens 12 the interior concave surface 14 of the lens may be readily perceived but not the outer convex surface 16.

In addition, the liquid should be compatible with the lens itself. Ordinary solutions used for storage of soft contact lenses are operable with the present invention. In addition, water may be used.

Preferably, the aperture 30 within the support means 18 is circular as depicted in the preferred embodiment of FIG. 3. Since the means for immobilizing the contact lens involves the balancing of surface tension forces between the portion of the support means 18 that defines the aperature 30 and the convex outer surface 16 of the lens 12, there must be some relationship between the size of the lens and the size of the aperture 30. The present invention has been found to be operable with the aperture 30 being within the range of ⅔ to ¾ the diameter of the lens 12; however, other relationships outside this range may also be operable.

As depicted in FIGS. 1 and 2, it is preferable that the plane of the aperture 30 be parallel to the surface of the liquid 22 when the lens 12 is immobilized. In such a manner, the surface tension forces on the lens that interact with the portion of the support member defining the aperture 30 are balanced in a manner that the lens is not distorted.

It is further preferred that the invention include means for controlling the moisture content of the lens. Soft contact lenses are designed to operate at a specific moisture content in the range of from 35 up to about 50%. When such lens have a moisture content less than the designed moisture content or are subjected to a concentration gradient across the thickness of the lens, distortion of the lens may result. The distortion may be uniform and result in a change in the measured radius of the lens, however, non-uniform distortion may also occur.

With reasonable skill, measurements may be made before surface evaporation can act to distort the lens. Where measurement is made by persons of little skill or upon lenses of exceedingly high water content, controlled humidity surounding the lens should be employed.

FIG. 5 shows the preferred embodiment of the apparatus designed to solve that problem. Since most of the outer convex surface 16 of the lens 12 is in contact with the liquid 20 and the inner concave surface 14 of the lens 12 is normally exposed to a gaseous environment, the potential exists for setting up a significant concentration gradient of liquid within the lens. To control such effects, it is preferred that the invention include means for controlling the moisture content of the lens. This preferably includes means for controlling the relative humidity of the gaseous atmosphere in contact with the lens.

As here embodied and depicted in FIG. 5, the atmosphere above the surface 22 at the liquid 20 could be controlled to a predetermined relative humidity. This eliminates any possible detrimental effects of a concentration gradient within the lens affecting its measured radius or distorting it. FIG. 5 schematically depicts a humidistat 42 that maintains a constant relative humidity within the container 28. This embodiment further includes an optically transparent cover 44 to maintain the desired relative humidity.

The actual means used to measure the physical characteristics or the optical characteristics of the contact lens are well known in the art. The device depicted herein is relatively simple and easily mounted on conventional measuring devices such as a radiuscope or keratometer.

FIG. 4 depicts prior art apparatus where a radiuscope 32, oriented in the vertical direction is disposed to measure the dimensions of a lens 12'. The lens 12' is supported on a post 34 having a radiused upper end 36. This apparatus is particularly useful for measuring the dimensions of hard contact lenses. As previously disclosed the direct contact of the support with the lens (here lens 12' and the radiused end 36) has the capacity to distort a soft contact lens.

FIG. 5 depicts an embodiment of the invention that is modified to allow the apparatus of FIG. 4 to be used with the present invention. In this embodiment, the container 28 includes a projection 38 disposed to fit over the post 34. In such a manner, a soft contact lens may be measured on prior art apparatus with the addition only of the device 10.

For devices having an optical path in the horizontal direction such as an ophthalmometer or keratometer, a mirror can be devised above the depicted embodiment of FIGS. 1-3 to reflect the image of the lens into a measurement device. One skilled in the art needs no specific teaching as to the apparatus needed to measure the physical and optical characteristics of a contact lens immobilized by the present invention.

OPERATION OF THE DEVICE

The apparatus depicted in FIGS. 1-3 is used to immobilize a contact lens to facilitate its remote measurement. In accordance with the invention, the method of this embodiment comprises floating the lens on the surface of a liquid and applying balanced surface tension forces to the convex exterior surface of the lens. The configuration of the preferred embodiment has been previously discussed in connection with the apparatus embodiment of the invention.

As here embodied and depicted in FIGS. 1-3, the balance surface tension forces are applied by supporting the lens on a support means having an aperture therethrough. The lens and means are placed within a container having liquid therein. The level of the liquid is such that the liquid floats the lens off of the support means. In such a manner, the lens is physically separate from the support means. The level of liquid is maintained in relation to the support means such that the surface tension of the liquid interacts with the portion of the support means defining the aperture and the exterior surface of the lens to apply balance surface tension forces to the lens. With the lens in the immobilized state, the measurement of physical dimensions of the lens can be readily accomplished without any attendant distortion of the lens by contact with a solid support.

Preferably, the method includes the step of isolating the lens from forces that would disturb the balance surface tension forces applied to the lens. The surface 22 of the liquid 20 should remain quiescent and the container 28 should be mounted in such a manner that use of the measurement apparatus will not impart any motion to the container 28 and hence to the liquid 20 and the lens 12.

The method preferably includes the step of controlling the moisture content of the lens as previously disclosed in relation to the apparatus embodiment of the invention.

The method and apparatus for immobilizing a contact lens for remote measurement is particularly adaptable to soft contact lenses since they are most susceptible to distortion by physical contact with support means. The method and apparatus is, however, not limited to such lenses and the measurement of hard contact lenses can be readily accomplished using the same method and apparatus disclosed herein.

It will be apparent to those skilled in the art that various modifications and variations can be made in the method and apparatus disclosed herein without departing from the scope of the invention as defined by the appended claims.

What is claimed is:

1. An apparatus for immobilizing a contact lens comprising:

(a) a support means having an aperture therethrough, the plane of the aperture being generally horizontal, the aperture also having a diameter less than the diameter of the lens;

(b) liquid surrounding the support means;

(c) means for containing the liquid such that it surrounds the supporting means; and (d) means for placing said lens on the surface of said liquid such that the lens can be immobilized by balanced surface tension forces between the lens and the portion of the support means defining the aperture.

2. The apparatus of claim 1 wherein the aperture is circular.

3. The apparatus of claim 2 wherein the plane of the aperture is parallel to the surface of the liquid when the lens is immobilized.

4. The apparatus of claim 1 including means for controlling the moisture content of the lens.

5. The apparatus of claim 4 wherein the means for controlling the moisture content of the lens comprises means for controlling the relative humidity of the gaseous atmosphere in contact with the lens.

6. The apparatus of claim 1 wherein said support means includes means for grasping said support means to allow said support means, with a lens situated thereon, to be placed within said containing means.

7. An apparatus for immobilizing a contact lens comprising:

(a) a container for containing a liquid, said container being wider than the diameter of a contact lens; and (b) means for placing said lens in the container on the surface of a liquid, said means comprising support means having an aperture therethrough, the plane of the aperture being generally horizontal, the aperture having a diameter less than the diameter of the lens such that the lens can be immobilized by balanced surface tension forces on the convex exterior surface of the lens while said lens is in contact solely with said liquid.

8. A method of immobilizing a contact lens to facilitate remote measurement thereof, comprising the steps of:

(a) floating the lens on the surface of a liquid; and (b) immobilizing the lens on the surface of the liquid by maintaining the level of the liquid in relation to an aperture having a diameter less than the diameter of the lens, said aperture being a part of a support means, such that balanced surface tension forces are applied to the convex exterior surface of the lens while the lens is in contact solely with the liquid.

9. The method of claim 8 including the steps of:

(a) supporting the lens on a support means having an aperture therethrough;

(b) placing the lens and support means within a container having liquid therein;

(c) floating the lens off of the support means; and (d) maintaining the level of liquid in relation to said support means such that the surface tension of the liquid interacts with both the portion of the support means defining the aperture and the exterior surface of the lens to apply balanced surface tension forces to the lens.

10. The method of claim 8 or 9 wherein said aperture is circular and having the plane of said aperture parallel to the surface of the liquid.

11. The method of claim 8 wherein the lens is a hydrophilic lens and the method includes the step of controlling the moisture content of the lens.

12. The method of claim 11 wherein the moisture content of the lens is controlled by controlling the relative humidity of the gaseous atmosphere in contact with the lens.

13. A method of measuring the physical dimensions of a hydrophilic contact lens, including the steps of:
 (a) supporting the lens on a support means having a circular aperture therethrough;
 (b) placing the lens and support means within a container having liquid therein;
 (c) floating the lens off of the support means;
 (d) maintaining the level of the liquid in relation to the support means such that the plane of the aperture is parallel to the surface of the liquid and such that the surface tension of the liquid interacts with both the portion of the support means defining the aperture and the convex exterior surface of the lens to immobilize the lens; and
 (e) measuring remotely the physical dimensions of the immobilized lens.

14. The method of claim 13 including the step of controlling the moisture content of the lens.

15. The apparatus of claim 1 or 7 wherein the diameter of the aperture is within the range of about ⅔ to ¾ of the diameter of the contact lens.

16. The method of claim 8 or 13 wherein the diameter of the aperture is within the range of about ⅔ to ¾ of the diameter of the contact lens.

* * * * *